March 9, 1971  W. OEHLER ET AL  3,568,302

METHOD OF MAKING PRESSURE CONTAINERS

Filed March 4, 1968

INVENTORS

Werner Oehler
Werner Müller

United States Patent Office 3,568,302
Patented Mar. 9, 1971

3,568,302
METHOD OF MAKING PRESSURE CONTAINERS
Werner Oehler and Werner Müller, Gummersbach, Rhineland, Germany, assignors to L. & C. Steinmuller G.m.b.H., Gummersbach, Germany
Filed Mar. 4, 1968, Ser. No. 710,250
Claims priority, application Germany, Mar. 3, 1967, St 26,581
Int. Cl. B23k 31/02
U.S. Cl. 29—477.3                                      4 Claims

ABSTRACT OF THE DISCLOSURE

A method of making pressure containers from tubular means, which includes the steps of winding the tubular means in the form of an individual flexible tube or in the form of a group of superimposed flexible tubes around a core member having an outer contour corresponding to the inner contour of the container to be built up by said tubular means, and welding the thus formed windings together along their outer and inner contacting areas.

The present invention relates to a method of producing pressure containers the mantle portions of which are built up from pipes of different cross-section. Pressure containers as they are employed in particular in the chemical industry and with which a medium in the container is supposed to withdraw heat or give off heat, are to this end provided on the outside thereof with semi-cup profiles in which the heat absorbing or heat releasing medium is guided. The mounting of these profiles on the pressure container is rather awkward and in view of the required welding of the semi-cups onto the container mantle, do not assure a sufficient degree of tightness.

The problem underlying the present invention consists in the provision of a method for producing containers of the above-mentioned type while employing tube profiles of different types according to which the above-mentioned drawbacks will be overcome.

It is another object of this invention to provide a method as set forth in the preceding paragraph which will assure an optimum heat transfer.

Figure 1:
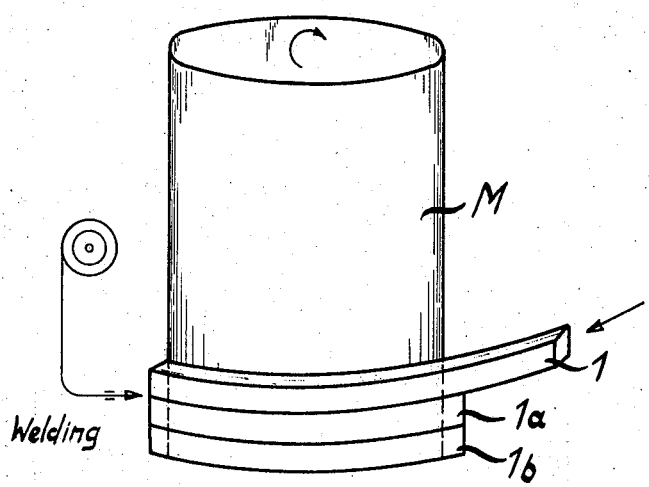
Figure 2:
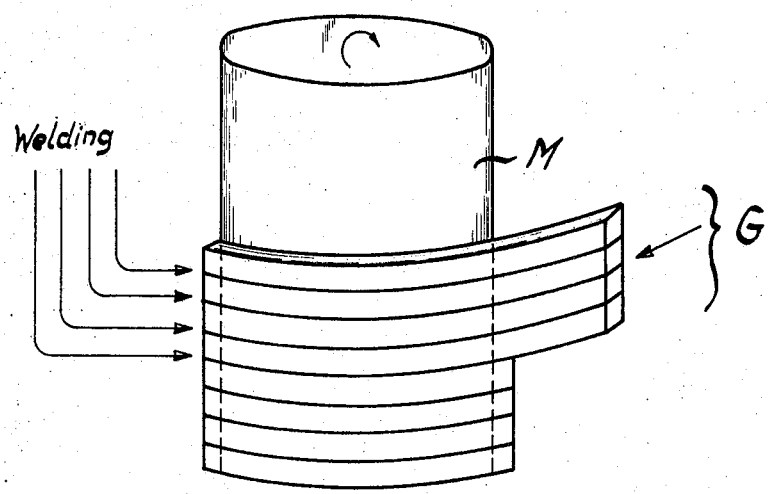

These and other objects and advantages of the invention will appear more clearly from the following specification in connection with the accompanying drawing, in which:

FIG. 1 illustrates a first method according to the invention in conformity with which the pipes are individually spirally wound around a mantle; and FIG. 2 principally illustrates the same method according to FIG. 1 but with the difference that a plurality of spirals are as a unit wound around a mantle.

According to the present invention as illustrated in FIG. 1, an individual pipe 1 is spirally wound around a mantle M and during the said winding-up operation, the individual windings 1a 1b are at their connecting areas welded together on the outside. Subsequently, the mantle M is withdrawn and the windings 1a, 1b . . . are at their connecting areas welded together on the inside thereof. Due to the fact that during the winding-up operation the individual pipes are already welded on the outside at their contacting areas, an unfolding or springing up of the windings will be avoided.

The method according to the invention as illustrated in FIG. 2 is principally the same as in FIG. 1 with the only difference that a plurality of pipes 1 are combined into a group G and that this group of pipes is wound spirally around the mantle M. Also in this instance the adjacent windings of the pipes and the adjacent windings of the group of pipes are first welded together on the outside, and after removal of the mantle M are welded together on the inside.

If it is desired to build up a container for a specific purpose, for instance, a container which has to be corrosion-resistant, it is, of course, possible in addition to the welding connection on the inside of the built-up container also additionally to deposit a layer of a special alloy which, following the welding on the inside is applied by welding plating (Schweissplattierung).

With the method according to the present invention it is possible in a simple manner to produce containers not only of symmetrical shape but also of conical shape while the particular profile can be so selected as to influence the heat transfer.

It is, of course, to be understood, that the present invention is, by no means, limited to the particular embodiments set forth above, but also comprises any modifications within the scope of the appended claims.

What we claim is:

1. A method of making pressure containers from tubular means, which includes the steps of: spirally winding tubular means about a core member having an outer contour corresponding to the inner contour of the container to be formed by said tubular means, primarily welding the windings thus being formed together along the outer abutting portions thereof, after the winding of said tubular means around said core member and the welding together of the windings thereof at their respective outer abutting portions withdrawing only said core member itself from within said windings, and secondarily welding said windings alone together along their inner abutting portions.

2. A method according to claim 1, in which a single flexible tubular member is employed exclusively as tubular means in continuous welded relationship.

3. A method according to claim 1, in which a plurality of superimposed flexible tubes is used exclusively as tubular means in continuous welded relationship.

4. A method according to claim 1, which includes the step of plating by additionally welding the inner wall surface of the container built up by said tubular means spirally wound and welded together.

References Cited

UNITED STATES PATENTS

| | | | |
|---|---|---|---|
| 1,934,064 | 11/1933 | Hermanson et al. | 29—483X |
| 2,135,800 | 11/1938 | Davignon. | |
| 2,154,942 | 4/1939 | Karmazin | 29—477.3X |
| 2,216,606 | 10/1940 | Taylor | 29—477.3 |
| 2,837,626 | 6/1958 | Buck et al. | 29—477.7X |
| 2,991,740 | 7/1961 | Eckhardt | 228—15 |
| 3,101,526 | 8/1963 | Paullus | 29—475X |
| 3,236,992 | 2/1966 | Roberts | 29—477.3X |
| 3,432,914 | 3/1969 | Huck | 29—477.3 |

JOHN F. CAMPBELL, Primary Examiner
R. B. LAZARUS, Assistant Examiner

U.S. Cl. X.R.
29—477, 477.7; 113—120